US011353766B2

United States Patent
Li et al.

(10) Patent No.: US 11,353,766 B2
(45) Date of Patent: *Jun. 7, 2022

(54) ABX₃ PEROVSKITE PARTICLES AND THEIR APPLICATION IN REVERSE MODE CONTROLLING PHOTO-FLUX

(71) Applicant: ZHEJIANG JINGYI NEW MATERIAL TECHNOLOGY CO. LTD, Zhejiang (CN)

(72) Inventors: Yanan Li, Montreal (CA); Dawei Zhang, Lachine (CA); Shiyong Zhao, Longueuil (CA); Shuyong Xiao, St-Laurent (CA); Bin Liang, Zhejiang (CN); Yuzhe Zhang, Zhejiang (CN)

(73) Assignee: ZHEJIANG JINGYI NEW MATERIAL TECHNOLOGY CO. LTD, Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/263,911

(22) PCT Filed: Jul. 19, 2019

(86) PCT No.: PCT/CN2019/096775
§ 371 (c)(1),
(2) Date: Jan. 28, 2021

(87) PCT Pub. No.: WO2020/029770
PCT Pub. Date: Feb. 13, 2020

(65) Prior Publication Data
US 2021/0263386 A1 Aug. 26, 2021

Related U.S. Application Data

(63) Continuation of application No. 16/055,444, filed on Aug. 6, 2018.

(51) Int. Cl.
G02F 1/169 (2019.01)
C01G 21/00 (2006.01)

(52) U.S. Cl.
CPC .......... G02F 1/169 (2019.01); C01G 21/006 (2013.01); C01P 2002/34 (2013.01); C01P 2004/03 (2013.01); C01P 2004/24 (2013.01)

(58) Field of Classification Search
CPC ............... C01D 17/003; C01G 19/006; H01L 21/02422; C01P 2002/34; G02F 1/169
See application file for complete search history.

(56) References Cited

U.S. PATENT DOCUMENTS 3,585,381 A 6/1971 Hodson et al.
3,708,219 A 1/1973 Forllni et al.
(Continued)

FOREIGN PATENT DOCUMENTS

CN 204374563 U 6/2015
CN 106154617 A 11/2016
(Continued)

OTHER PUBLICATIONS

The European Search Report dated Oct. 23, 2020 for European Application No. 19821429.8.
(Continued)

*Primary Examiner* — Khanh T Nguyen
(74) *Attorney, Agent, or Firm* — Yue (Robert) Xu; Apex Attorneys at Law, LLP

(57) ABSTRACT

A reverse mode light valve, the manufacture of a light control device and a method of controlling light transmittance by using of the reverse mode light valve, the reverse mode light valve containing ABX₃ perovskite particles (200) suspended in a liquid suspension (300) can control light transmittance in a higher light transmittance when the power is turned off (OFF state) and lower light transmittance when
(Continued)

the power is turned on (ON state). In the $ABX_3$ perovskite particles (200), A is at least one of $Cs^+$, $CH_3NH_3^+$, and $Rb^+$, B is at least one of $Pb^{2+}$, $Ge^{2+}$, and $Sn^{2+}$, and X is at least one of $Cl^-$, $Br^-$, and $I^-$.

8 Claims, 4 Drawing Sheets

(56) References Cited

U.S. PATENT DOCUMENTS

| | | | |
|---|---|---|---|
| 6,383,577 | B1 | 5/2002 | Chidichimo et al. |
| 6,498,358 | B1 | 12/2002 | Lach et al. |
| 6,606,185 | B2 | 8/2003 | Saxe |
| 9,581,877 | B2 | 2/2017 | Bass et al. |
| 2006/0097233 | A1 | 5/2006 | Pichot et al. |
| 2011/0235161 | A1 | 9/2011 | Joo et al. |
| 2012/0133672 | A1 | 5/2012 | Joo |
| 2014/0176615 | A1 | 6/2014 | Avci et al. |
| 2015/0268531 | A1 | 9/2015 | Wang et al. |
| 2017/0077402 | A1 | 3/2017 | Oooka et al. |
| 2017/0217785 | A1* | 8/2017 | Yang ............... H01L 21/02422 |

FOREIGN PATENT DOCUMENTS

| | | |
|---|---|---|
| CN | 106886102 A | 6/2017 |
| CN | 106970476 A | 7/2017 |
| CN | 107577076 A | 1/2018 |
| CN | 108089388 A | 5/2018 |
| CN | 109491174 A | 3/2019 |
| EP | 0390139 A2 | 10/1990 |
| JP | H0366492 U | 6/1991 |
| JP | H06158083 A | 6/1994 |
| JP | H06214262 A | 8/1994 |
| JP | 2008107740 A | 5/2008 |
| JP | 2012058677 A | 3/2012 |
| JP | 2012533777 A | 12/2012 |
| WO | 2015022980 A1 | 2/2015 |

OTHER PUBLICATIONS

Lin Jia et al: "Thermochromic halide perovskite solar cells", Nature Materials, Nature Pub. Group, London, vol. 17, No. 3, Jan. 22, 2018 (Jan. 22, 2018), pp. 261-267, XP036431772, ISSN: 1476-1122, DOI:10.1038/S41563-017-0006-0.

Lance M. Wheeler et al: "Switchable photovoltaic windows enabled by reversible photothermal complex dissociation from methylammonium lead iodide", Nature Communications, vol. 8, No. 1, Nov. 23, 2017 (Nov. 23, 2017), pp. 1-9, XP055678589, DOI: 10.1038/S41467-017-01842-4.

The Japanese 1st Office Action dated Jan. 27, 2021 for JP2020-541495.

International Search Report for PCT/CN2019/096775 dated Sep. 27, 2019, ISA/CN.

Tien-Jung Chen, Electro-Optical Properties of Reverse Mode Polymer Dispersed Liquid Crystal Films, Japanese Journal of Applied Physics, vol. 43, No. 4B, 2004, pp. L 557-L 559, 2004 The Japan Society of Applied Physics, published Apr. 2, 2004.

The 1st Office Action dated Apr. 27, 2021 for the Chinese Patent Application No. CN201980003454.5.

* cited by examiner

ABX₃ PEROVSKITE PARTICLES AND THEIR APPLICATION IN REVERSE MODE CONTROLLING PHOTO-FLUX

CROSS REFERENCE TO RELATED APPLICATIONS

This application is a U.S. National Phase application based upon PCT Application No. PCT/CN2019/096775, filed on Jul. 19, 2019, which claims the priority of U.S. patent application Ser. No. 16/055,444, filed on Aug. 6, 2018, and titled with "$ABX_3$ PEROVSKITE PARTICLES AND THEIR APPLICATION IN REVERSE MODE CONTROLLING PHOTO-FLUX", and the disclosures of which are hereby incorporated by reference.

FIELD

The present invention is related to a reverse mode light valve containing $ABX_3$ perovskite particles that can control the light transmission. The present invention also provides a new use of the reverse mode light valve and a method of controlling light transmittance by using the reverse mode light valve.

BACKGROUND

A light valve is a device that can regulate the amount of light passing through a media like a water valve that can control the water flow. In this invention, the light valve is a device which can electronically control the light transmittance, and such a device is also scientifically referred as an electrochromic device. Depending on science behind an electrochromic device, it can be further classified as polymer dispersed liquid crystal (PDLC) (U.S. Pat. No. 3,585,381), electrochemical device (EC) (U.S. Pat. No. 9,581,877) and suspension particles display (SPD) (U.S. Pat. No. 6,606,185).

In a typical light valve, it transmits less light through when the power is turned off (OFF state), and it transmits more light through when the power is turned on (ON state); such an electrochromic device is thus referred to as a normal mode light valve. A reverse mode light valve functions in a different way. The reverse mode light valve manipulates the light in a reversed way as to that of the normal mode light valve, and it transmits more light through when the power is turned off (OFF state) and thus becomes dark, and it transmits less light through when the power is turned on (ON state). For the normal mode light valve, it is less transparent when power is off, so once the power supply system fails, there is less light through the light valve, this may cause an adverse situation or potential risk in certain circumstances. For example, the passengers of the vehicle would be difficult to spot the hazard situation outside when the electrochromic window lose its electric power. Contrary to a normal mode light valve, the reverse mode light valve is more transparent at an OFF state, which eventually avoids the visibility problem in case of a power failing. Furthermore, passengers in most time need visibility for driving and for sightseeing, so the light valves (electrochromic windows here specifically) need to be transparent. To maintain a long period transparency, a normal mode light valve is required to be powered ON all the time, but a reserve mode light valve would simply be in OFF state without the need of power supplying in most of the time. Obviously, the reverse mode light valve is energy-saving most time compared to the normal mode light valve.

Considering above merits with respect to safety and energy saving, the reverse mode light valve is highly demanded in the art. However, the development of such a reverse mode light valve is still a scientific challenge. There are a few reports related to reverse mode light valves found in prior arts, such as CN201710186038.6, WO/2015/022980, CN201420849573.7, U.S. Pat. No. 6,383,577, and an article published in Japanese Journal of Applied Physics (L557-L559, 43 (4B), 2004). These materials, including polymer stabilized liquid crystal (PSLC), are not satisfying due to their limited success rate, complex manufacture process and/or high production cost.

Therefore, a new reverse mode light valve solving one or more of the above disadvantages is in urgent need in the field.

SUMMARY

It is surprisingly found by the inventors that perovskite particles can be used in a reverse mode light valve. Particularly, it is surprisingly found that perovskite particles, especially halide $ABX_3$ perovskite particles suspended in a liquid suspension can be polarized under an electric field and be oriented.

It is found that it is possible to use $ABX_3$ perovskite particles to control the flux of light in a reverse mode electrochromic device, i.e., a reverse mode light valve (r-LV for short hereafter). Specifically, in this invention, the reverse mode light valve is referred a device that the light transmittance can be controlled by alternating current (AC). This reverse mode means more transparent when the power is turned off (OFF state) and less transparent when the power is turned on (ON state).

Perovskite, originated from the Russian geologist Perovskite and originally single-pointed the calcium titanate ($CaTiO_3$) mineral. Later, crystals with similar structures were collectively referred to as perovskites. The cell structure of the halide $ABX_3$ perovskite referred to in this patent is shown in FIG. 4, wherein, B atom and 6 X atoms form octahedral units, and 8 octahedral units occupy the position of the hexahedral apex centered on the A atom.

$ABX_3$ perovskite material is known in the art and there are a lot of reports on the applications thereof. In 2009, the $ABX_3$ perovskite material was first reported for solar cells (J. Am. Chem. Soc. 131, 6050-6051, 2009). "Science" rated perovskite solar cells as one of the top 10 scientific breakthroughs in 2013. In January 2018, the Swiss Federal Institute of Technology in Lausanne set a new world record efficiency of 23.25% for a perovskite solar cell. In addition, the $ABX_3$ perovskite material has been explored in other potential applications, such as LED (Light Emitting Diodes) (Tan, Zhi-Kuang, et al., Nature Nanotechnology, 9: 687-692, 2014), Lasers (Haiming Zhu, et al., Nature Mater., 14: 636-642, 2015), Photodetectors (Zhenqian Yang, et al., Adv. Materials, 30(8):1704333, 2018), Memristors (Zhengguo Xiao, et al., Advanced Electronic Materials, 2(7): 1600100, 2016), Photocatalytic (Sunghak Park, et al., Nature Energy, 2, 16185, 2016), Thermochromic (Jia Lin, et al., Nature Materials, 17, 261-267, 2018), and Ferroelectrics (Heng-Yun Ye, et al., Science, 2018, 361, 151-155).

Based on the above finding, in the first aspect, a reverse mode light valve (r-LV) is provided, which comprises a first layer of a transparent conductive substrate; an active layer containing $ABX_3$ perovskite particles suspended in a liquid suspension; and a second layer of transparent conductive substrate.

This invention also presents a method to use $ABX_3$ perovskite particles to control the flux of light in a light control device (referred as a light valve). The present invention provides a new use of a reverse mode light valve comprising the $ABX_3$ perovskite material, and method to make such a material. More specifically, the invented r-LV device comprises a liquid suspension having such a material of $ABX_3$ perovskite particles, which can electronically control transmission of light in such way that it allows more light transmitted through when the power is turned off (OFF state) and less light transmitted through when the power is turned on (ON state). Still, $ABX_3$ perovskite particles with a more specific chemical composition is specified, where A is at least one of $Cs^+$, $CH_3NH_3^+$, and $Rb^+$, B is at least one of $Pb^{2+}$, $Ge^{2+}$, and $Sn^{2+}$, and X is exclusively selected from one of halide anions including $Cl^-$, $Br^-$, or $I^-$. As such a specified composition, the said $ABX_3$ perovskite material is referred as halide $ABX_3$ perovskite material. Preferably, the $ABX_3$ perovskite particles are halide $ABX_3$ perovskite particles. Preferably, A is at least one of $Cs^+$, $CH_3NH_3^+$, and $Rb^+$, B is at least one of $Pb^{2+}$, $Ge^{2+}$, and $Sn^{2+}$, and X is at least one of $Cl^-$, $Br^-$, and $I^-$. More preferably, A is at least one of $Cs^+$ and $CH_3NH_3^+$, B is $Pb^{2+}$, X is at least one of $Br^-$ and $I^-$.

Preferably, the perovskite particles have a non-spherical morphology.

Preferably, the perovskite particles have a morphology of nanorods (one-dimensional), nanosheets (two-dimensional), cuboids, or irregular (three-dimensional) particles.

It is further found surprisingly that when the perovskite particles have a morphology of nanosheets, the light valve has a higher light transmittance in off-state (when the light value is turned off) than on-state (when the light valve is turned on). More preferably, the light valve has a high light transmittance in off-state and has a low light transmittance in on-state.

Particularly, the $ABX_3$ perovskite particles have a morphology of nanosheets. Preferably, for the nanosheets, it has a length of 50 nm-2000 nm, more preferable 200 nm-500 nm, and a thickness of 5 nm-100 nm, more preferable 10 nm-50 nm.

More preferably, for the nanosheets, it has a length of 50 nm-2000 nm, more preferable 200 nm-500 nm, and a thickness of 5 nm-100 nm, more preferable 10 nm-50 nm, and a width of 50 nm-2000 nm, more preferable 200 nm-500 nm. More preferably, for the nanosheets, it has a ratio of width:thickness of 1:1, more preferable a ratio of width:thickness above 3:1. Particularly preferably, for the nanosheets, it has a length of 200 nm-500 nm, a thickness of 10 nm-50 nm, a width of 200 nm-500 nm, and a ratio of width:thickness above 3:1.

Preferably, the perovskite particles are uniformly dispersed in the liquid suspension.

Preferably, the liquid suspension maintains the suspended perovskite particles in gravitational equilibrium.

Preferably, the liquid suspension further comprises one or more of a mineral resistive material, a synthetic resistive material, and a vegetable oil.

Preferably, the liquid suspension is sandwiched between the two layers of transparent conductive substrate as electrodes.

In a further aspect of the invention, a method of controlling light transmittance is provided, comprising using the reverse mode light valve according to the present invention in a light control device. In some cases, the reverse mode light valve itself is used as the light control device. In some cases, the reverse mode light valve is a part of the light control device.

In a further aspect of the invention, the present invention relates to use of the reverse mode light valve according to the invention in the manufacture of a light control device.

In some preferred embodiments, the light control device is selected from the group consisting of a smart window, a rear window of a car, a lens, a light shutter and a display.

In a further aspect of the invention, the present invention relates to a reverse mode light valve as described herein, for use in controlling light transmittance.

According to this invention, the liquid suspension, which is used as a liquid medium to suspend the $ABX_3$ perovskite particles, comprises one or more a mineral resistive material, a synthetic resistive material, and a vegetable oil.

According to this invention as illustrated in FIG. 1, the transparent electrode (100) can be made of the same material or different materials, where light can be transmitted through, preferably having a light transmittance equals to or greater than 80%.

DETAILED DESCRIPTION

The present invention provides a new use for $ABX_3$ perovskite particles to control the flux of light in a light control device in a reverse mode, thus referred as a reverse light valve (r-LV).

Figure 1:
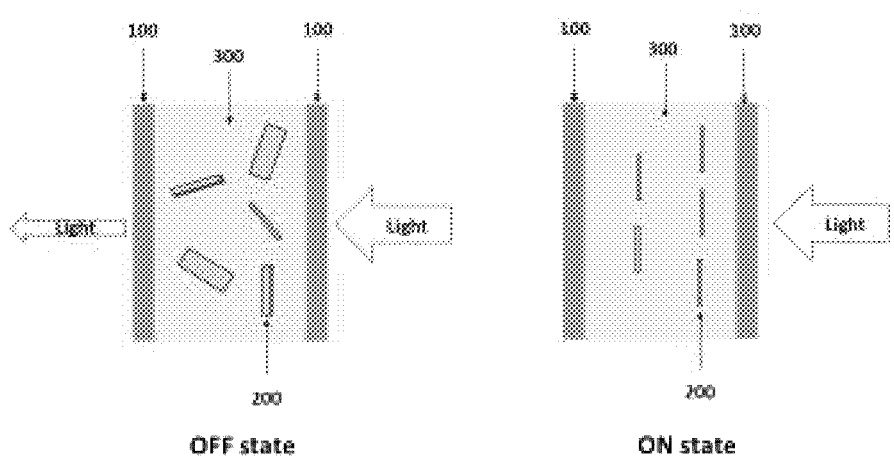
FIG. 1 presents schematically the r-LV, wherein, a liquid suspension (300) is sandwiched between two transparent substrates (100) and (100). The $ABX_3$ perovskite particles (200) are suspended in the liquid suspension (300).

FIG. 1 schematically illustrates a typical r-LV device, wherein, a liquid suspension (300) is sandwiched between two transparent substrates (100) and (100). The $ABX_3$ perovskite particles (200) are suspended in the liquid suspension (300). Without any theory limitation, it is assumed that, in the absence of an applied electrical field (OFF state), the $ABX_3$ perovskite particles in the liquid suspension assume random positions due to Brownian movement. Hence, the beam of light passing into the light valve is partially absorbed/scattered, other part of light transmits through the light valve, so the light valve is thus relatively bright and transparent in the OFF state. When an electric field is applied thereto (ON state), the light control $ABX_3$ perovskite particles are polarized, that the effective maximum surface of the $ABX_3$ perovskite particles is perpendicular to the direction of the electric field. Hence, a major part of light going into the light valve is absorbed/scattered, and other smaller fraction of light is transmitted through, so the light valve is thus relatively darker and less transparent in the ON state.

Therefore, being the first time, the present invention provides a novel use of the $ABX_3$ perovskite particles in a reverse mode light control device (r-LV). According to the present invention, the invented r-LV comprises a liquid suspension having such a material of $ABX_3$ perovskite particles, which can electronically control transmission of light in such way that it allows more light transmitted through when the power is turned off (OFF state) and less light transmitted through when the power is turned on (ON state). Still, $ABX_3$ perovskite particles with a more specific chemical composition is disclosed, where A is at least one of $Cs^+$, $CH_3NH_3^+$, and $Rb^+$, B is at least one of $Pb^{2+}$, $Ge^{2+}$, and $Sn^{2+}$, and X is at least one of halide anions selected from $Cl^-$, $Br^-$, or $I^-$. Accordingly, the specified $ABX_3$ perovskite material is also referred to as halide $ABX_3$ perovskite material. According to this invention, the $ABX_3$ perovskite material is used in a form of particles, thus more specifically these particles used can also be referred to as halide $ABX_3$ perovskite particles. Still according to the invention, these $ABX_3$ perovskite particles are characterized in that have a non-spherical morphology. Still further, the $ABX_3$ perovskite particles morphology is at least one of nanorods (one-dimensional); nanosheets (two-dimensional); cuboids, and irregular (three-dimensional). In particularly preferred embodiments, the $ABX_3$ perovskite particles have a morphology of nanosheets.

As illustrated in FIG. 1, the $ABX_3$ perovskite particles (200) which are encapsulated inside the said liquid suspension (300) are preferably capable of re-orientating themselves in an electronic field. Therefore, the geometric dimension of the $ABX_3$ perovskite particles are preferably scientifically optimized. According to the invention, the $ABX_3$ perovskite particles are preferably in a form of flakes and also referred to as nanosheets herein. Still the nanosheets are preferably having a length of about 50 nm-2000 nm, more preferably 200 nm-500 nm, and a thickness of 5 nm-100 nm, more preferably 10 nm-50 nm.

More preferably, for the nanosheets, it has a length of 50 nm-2000 nm, more preferable 200 nm-500 nm, and a thickness of 5 nm-100 nm, more preferable 10 nm-50 nm, and a width of 50 nm-2000 nm, more preferable 200 nm-500 nm. More preferably, for the nanosheets, it has a ratio of width:thickness of 1:1, more preferable a ratio of width:thickness above 3:1. Particularly preferably, for the nanosheets, it has a length of 200 nm-500 nm, a thickness of 10 nm-50 nm, a width of 200 nm-500 nm, and a ratio of width:thickness above 3:1.

According to the invention, the $ABX_3$ perovskite particles are preferably capable of being polarized under an electric field, and still the effective maximum surface of the polarized $ABX_3$ perovskite particles is perpendicular to direction of the electric field. In one embedment, the $ABX_3$ perovskite particles are nanosheets, after being polarized under an electric field, the surface of the large specific surface of the nanosheets is oriented to be perpendicular to the direction of the electric field.

According to this invention, the liquid suspension (300), which is used as a liquid medium to suspend the $ABX_3$ perovskite particles, comprises one or more non-aqueous, electrically resistive liquids or a liquid mixture. Such a liquid or a liquid mixture, referring as the suspension medium, can maintain the suspended $ABX_3$ perovskite particles in gravitational equilibrium.

The liquid suspension medium used in the reverse mode light valve of the present invention can be any proper liquid suspension medium known in the art and can be formulated according to techniques well known to those skilled in the art. Preferably, the liquid suspension (300) comprises one or more suspension medium selected from the group consisting of a mineral resistive material, a synthetic resistive material, and a vegetable oil. Mineral resistive materials, such as transformer oils; synthetic resistive materials, such as silicone oils, fluorocarbon organic compounds, plasticizers (such as Dioctyl phthalate, Dibutyl phthalate, Diisobutyl phthalate, Triisodecyl trimellitate (TDTM) etc.), dodecylbenzene, polybutene oil, etc.; vegetable oils, such as castor oil, soybean oil, rapeseed oil, etc., are good liquid suspension mediums.

According to this invention as illustrated in FIG. 1, the transparent electrodes (100) at both sides can be made of the same material or different materials, where light can be transmitted through, preferably having a light transmittance equals to or greater than 80%, more preferably 90%. Either one or both the transparent electrodes (100) can be ITO conductive glass, ITO/PET conductive film, Ag nanowire/PET conductive film, or Cu nanowire/PET conductive film. The transparent electrodes (100) are preferred to be of the same material for the simplicity of processing and for the same physical properties (such as flexibility and thermal expansion), important for device durability under certain conditions, such as thermal stress.

The liquid suspension containing the $ABX_3$ perovskite particles sandwiched between the two transparent electrodes is preferably sealed with a resistive material, such as epoxy resin, etc. An alternating current is preferably applied through the transparent electrodes (110) to control the light transmittance through the assembled r-LV, and the voltage of such an alternating current is preferably in the range of 5-500 V, more preferably in a range of 30-220 V, which can be easily achieved by a common transformer.

The invention will now be described in more detail with reference to the following examples. However, these examples are given for illustration only and are not intended to limit the scope of the present invention. All chemicals used in the examples are purchased from Sigma-Aldrich Company unless otherwise specified. In all these examples, all parts and percentages are by weight unless otherwise noted. The light transmittance and absorption spectrum of the r-LV device was measured by an Oceanview spectrometer.

Example 1 Preparation of Cs-Oleate

Cesium carbonate ($Cs_2CO_3$, 4.07 g) was loaded into a 250 mL 3-neck flask along with octadecene (ODE, 50 mL) and oleic acid (11.088 g), and the mixture was dried for 1 h at 120° C. and then heated under Argon (Ar) to 150° C. until all $Cs_2CO_3$ reacted with oleic acid. The obtained Cs-Oleate may precipitate out of ODE at room temperature, and it can be preheated to make it soluble before further using.

Example 2 Synthesis of $CsPbI_3$ Nanosheets

N, N-dimethylformamide (DMF, 100 mL) and lead iodide ($PbI_2$, 2.305 g) were charged into a 250 mL flask. Oleic acid (0.438 g) and octylamine (2.339 g) were added. After complete solubilization of $PbI_2$, 5 mL Cs-Oleate solution was added (prepared as described in Example 1). Then, the resulted solution was added into a 5 L flask along with 4200 mL of toluene. Subsequently, the resulted solution was centrifuged at 5000 G for 1.5 hours and the supernatant was discarded to yield the light control $CsPbI_3$ nanosheets. Finally, the $CsPbI_3$ nanosheets were further dispersed with 500 mL of toluene, mixed well with shaking and sonication (referring to as LCP-Example-2).

Example 3 Synthesis of $CsPbBr_3$ Nanosheets

Figure 3:
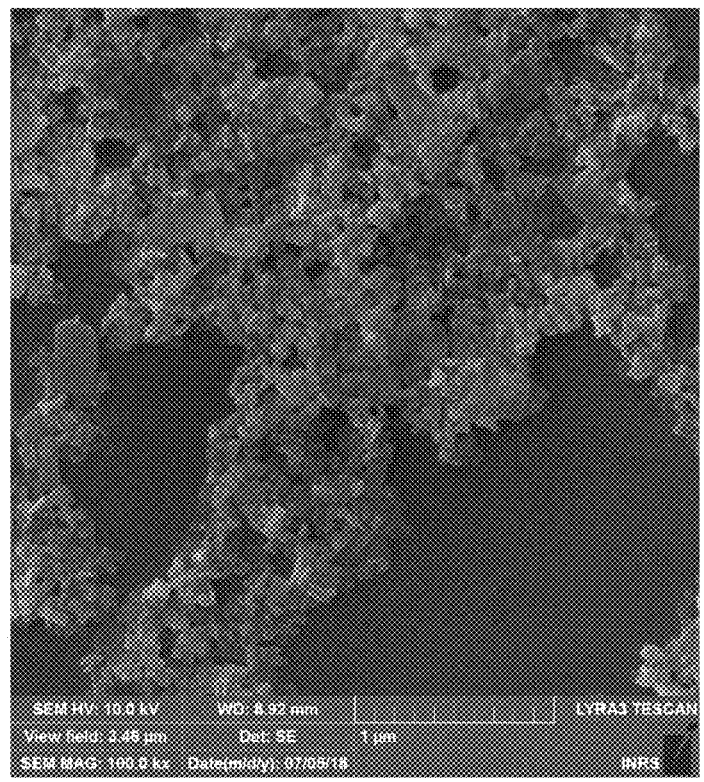
FIG. 3 presents SEM image of $CsPbBr_3$ nanosheets according to this invention Example 3.
Figure 4:
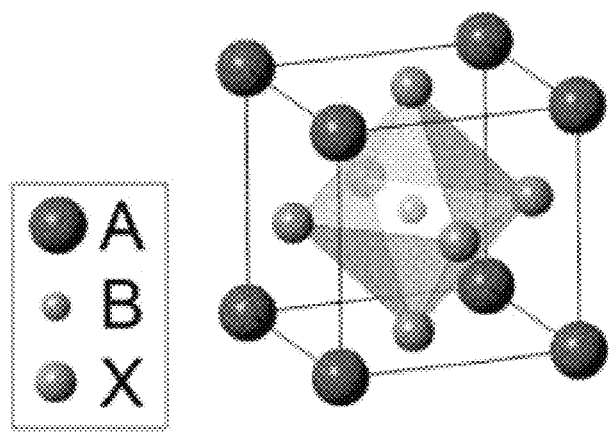
FIG. 4 presents the cell structure of the $ABX_3$ perovskite.

In the same manner as in Example 2, except that 1.835 g of $PbBr_2$ was used instead of 2.305 g of $PbI_2$. A toluene mixture containing $CsPbBr_3$ nanosheets is obtained and referred to as LCP-Example-3. FIG. 3 presents SEM image of $CsPbBr_3$ nanosheets.

Example 4 Preparation of r-LV Suspension Containing $CsPbI_3$ Nanosheets

Into a 250 mL round bottom glass flask was weighted 10 g of Triisodecyltrimellitate (TDTM), then the LCP-Example-2 prepared in the Example 2 was added in portions. After thoroughly mixing the resulted suspension by shaking, toluene was subsequently removed by a rotary evaporator for 3 hours at 80° C. to yield a r-LV suspension containing $CsPbI_3$ nanosheets, which is referred to as r-LV Suspension Example-4.

Example 5 Preparation of r-LV Suspension Containing $CsPbBr_3$ Nanosheets

Into a 25 0 mL round bottom glass flask was weighted 10 g of silicone oil, then the LCP-Example-3 prepared in the Example 3 was added in portions. After thoroughly mixing the resulted suspension by shaking, toluene was subsequently removed by a rotary evaporator for 3 hours at 80° C. to yield a r-LV suspension containing $CsPbBr_3$ nanosheets, which is referred to as r-LV Suspension Example-5.

Example 6 r-LV Devices Made from r-LV Suspension-Example-4

Figure 2:
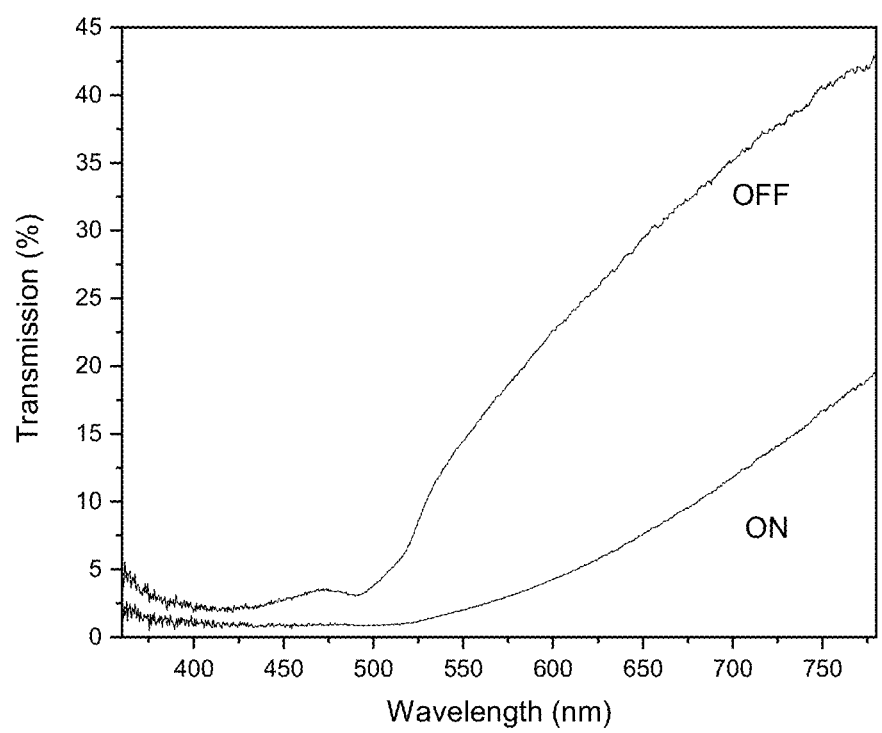
FIG. 2 presents light transmittance of a r-LV device made according to this invention Example 6 before and after applying an electric voltage of 220V.

In this example, a layer of the r-LV Suspension-Example 4 made in Example 4 at a thickness of 200 um was sealed between two transparent electrodes of ITO conductive glass using epoxy resin to produce a light valve referring as r-LV Device-6. When no electric voltage was applied (OFF State), r-LV Device-6 exhibited an orange tint and light transmission was measured to be 19.4%. When it was electrically activated using 220 Volts AC at 50 Hz (ON State), the r-LV Device-6 became darker and light transmission was measured to be 7.0% only. Table 1 summarizes these results. Further, FIG. 2 presents the absorption spectrum of r-LV Device-6 at OFF state and ON state respectively.

Example 7 r-LV Devices Made from r-LV Suspension-Example-5

In this example, a layer of the r-LV Suspension-Example 5 made in Example 5 at a thickness of 180 μm was sealed between two transparent electrodes of ITO conductive glass using epoxy resin to produce a light valve referring to as r-LV Device-7. When no electric voltage was applied (OFF State), r-LV Device-7 exhibited an orange tint and light transmission was measured to be 25.1%. When it was electrically activated using 220 Volts AC at 50 Hz (ON State), the r-LV Device-7 became darker and light transmission was measured to be 12.5% only as listed in Table 1.

TABLE 1

Typical performance of r-LV devices

| Example | r-LV Device | Transmittance % | |
|---|---|---|---|
| | | Off state | On state |
| Example 6 | r-LV Device-6 | 19.4 | 7.0 |
| Example 7 | r-LV Device-7 | 25.1 | 12.5 |

The invention claimed is:

1. A light valve, comprising a first layer of a transparent conductive substrate; an active layer containing $ABX_3$ perovskite particles suspended in a liquid suspension; and a second layer of a transparent conductive substrate, wherein A is at least one of $Cs^+$ and $CH_3NH_3^+$, B is $Pb^{2+}$, and X is at least one of Bf and I$^-$; and the $ABX_3$ perovskite particles have a morphology of nanosheets having a length of 200 nm-500 nm, a thickness of 10 nm 50 nm, a width of 200 nm 500 nm, and a ratio of width: thickness above 3:1, wherein the light valve has a higher light transmittance on OFF-state and a lower light transmittance on ON-state.

2. The light valve as recited in claim 1, wherein the perovskite particles are uniformly dispersed in the liquid suspension.

3. The light valve as recited in claim 2, wherein the liquid suspension is capable of maintaining the suspended $ABX_3$ perovskite particles in gravitational equilibrium.

4. The light valve as recited in claim 2, wherein the liquid suspension comprises one or more of a mineral resistive material, a synthetic resistive material, a vegetable oil.

5. The light valve as recited in claim 2, wherein the liquid suspension is sandwiched between the first layer of a transparent conductive substrate and the second layer of a transparent conductive substrate as transparent electrodes.

6. A method of controlling light transmittance, comprising using the light valve according to claim 1 in a light control device.

7. A method of manufacturing a light control device, comprising using the light valve according to claim 1.

8. The method according to claim 7, wherein the light control device is selected from the group consisting of a smart window, a rear window of a car, a lens, a light shutter and a display.

* * * * *